(12) United States Patent
Larner et al.

(10) Patent No.: US 11,049,138 B2
(45) Date of Patent: *Jun. 29, 2021

(54) SYSTEMS AND METHODS FOR TARGETED ADVERTISING

(71) Applicant: AppBrilliance, Inc., Dripping Springs, TX (US)

(72) Inventors: Marcus G. Larner, Seattle, WA (US); Andrew Michael Moeck, Huntington Beach, CA (US)

(73) Assignee: AppBrilliance, Inc., Dripping Springs, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/941,778

(22) Filed: Mar. 30, 2018

(65) Prior Publication Data
US 2018/0225712 A1 Aug. 9, 2018

Related U.S. Application Data

(63) Continuation of application No. 14/815,796, filed on Jul. 31, 2015, now Pat. No. 9,959,553, which is a (Continued)

(51) Int. Cl.
*G06Q 30/02* (2012.01)
*H04N 21/45* (2011.01)
(Continued)

(52) U.S. Cl.
CPC ....... *G06Q 30/0255* (2013.01); *G06F 40/221* (2020.01); *G06F 40/30* (2020.01); *G06F 40/40* (2020.01); *G06Q 30/0256* (2013.01); *H04N 7/16* (2013.01); *H04N 21/25* (2013.01); *H04N 21/251* (2013.01); *H04N 21/252* (2013.01);
(Continued)

(58) Field of Classification Search
None
See application file for complete search history.

(56) References Cited

U.S. PATENT DOCUMENTS 5,729,659 A * 3/1998 Potter .................. G10L 15/193
704/257
5,794,210 A 8/1998 Goldhaber et al.
(Continued)

FOREIGN PATENT DOCUMENTS

| EP | 1150508 A2 | 10/2001 |
|---|---|---|
| EP | 1217560 A1 | 6/2002 |
| WO | 9950775 A1 | 10/1999 |

*Primary Examiner* — Justin E Shepard

(57) ABSTRACT

Methods of generating recommendations may include obtaining social network data from one or more network resources. Word relationships may be created between selected words in the social network data to produce relationship data. Advertisement or other asset recommendations may be generated for a target user by analyzing browse information of the target user to identify one or more words. Other words in the relationship data may be identified that are related to the words in the target user's browse information. One or more advertisements may be identified having at least one keyword that corresponds to the other words. At least a portion of these advertisements may be selected from a data repository to provide to the target user.

29 Claims, 11 Drawing Sheets

Related U.S. Application Data continuation of application No. 14/257,394, filed on Apr. 21, 2014, now Pat. No. 9,129,305, which is a continuation of application No. 13/860,461, filed on Apr. 10, 2013, now abandoned, which is a continuation of application No. 13/284,799, filed on Oct. 28, 2011, now Pat. No. 8,443,384, which is a continuation of application No. 12/098,385, filed on Apr. 4, 2008, now abandoned.

(60) Provisional application No. 60/910,581, filed on Apr. 6, 2007, provisional application No. 60/910,606, filed on Apr. 6, 2007, provisional application No. 60/910,583, filed on Apr. 6, 2007.

(51) Int. Cl.
  H04N 21/466     (2011.01)
  H04N 21/442     (2011.01)
  H04N 21/254     (2011.01)
  H04N 21/25      (2011.01)
  H04N 21/258     (2011.01)
  H04N 7/16       (2011.01)
  H04N 21/2668    (2011.01)
  H04N 21/658     (2011.01)
  H04N 21/81      (2011.01)
  G06F 40/30      (2020.01)
  G06F 40/40      (2020.01)
  G06F 40/221     (2020.01)

(52) U.S. Cl.
  CPC ....... *H04N 21/258* (2013.01); *H04N 21/2542* (2013.01); *H04N 21/25891* (2013.01); *H04N 21/2668* (2013.01); *H04N 21/44213* (2013.01); *H04N 21/44222* (2013.01); *H04N 21/45* (2013.01); *H04N 21/4532* (2013.01); *H04N 21/4661* (2013.01); *H04N 21/4667* (2013.01); *H04N 21/4668* (2013.01); *H04N 21/6582* (2013.01); *H04N 21/812* (2013.01)

(56) References Cited

U.S. PATENT DOCUMENTS

| | | | |
|---|---|---|---|
| 5,855,008 | A | 12/1998 | Goldhaber et al. |
| 5,948,061 | A | 9/1999 | Merriman et al. |
| 5,991,735 | A | 11/1999 | Gerace |
| 6,009,410 | A | 12/1999 | Lemole et al. |
| 6,073,105 | A | 6/2000 | Sutcliffe et al. |
| 6,119,098 | A | 9/2000 | Guyot et al. |
| 6,125,377 | A | 9/2000 | Razin |
| 6,243,375 | B1 | 6/2001 | Speicher |
| 6,324,519 | B1 | 11/2001 | Eldering |
| 6,339,761 | B1 | 1/2002 | Cottingham |
| 6,345,293 | B1 | 2/2002 | Chaddha |
| 6,385,592 | B1 | 5/2002 | Angles et al. |
| 6,487,538 | B1 | 11/2002 | Gupta et al. |
| 6,513,052 | B1 | 1/2003 | Binder |
| 6,615,251 | B1 | 9/2003 | Klug et al. |
| 6,647,425 | B1 | 11/2003 | Chaddha |
| 6,714,992 | B1 | 3/2004 | Kanojia et al. |
| 6,718,551 | B1 | 4/2004 | Swix et al. |
| 6,760,916 | B2 | 7/2004 | Holtz et al. |
| 6,771,290 | B1 | 8/2004 | Hoyle |
| 6,804,659 | B1 | 10/2004 | Graham et al. |
| 6,842,604 | B1 | 1/2005 | Cook et al. |
| 6,891,635 | B2 | 10/2005 | Dutta |
| 6,980,972 | B1 | 12/2005 | Allibhoy et al. |
| 7,047,551 | B2 | 5/2006 | Ogawa et al. |
| 7,062,510 | B1 | 6/2006 | Eldering |
| 7,065,497 | B1 | 6/2006 | Brewster et al. |
| 7,065,550 | B2 | 6/2006 | Raghunandan |
| 7,069,271 | B1 | 6/2006 | Fadel et al. |
| 7,072,847 | B2 | 7/2006 | Ulenas et al. |
| 7,072,849 | B1 | 7/2006 | Filepp et al. |
| 7,072,853 | B2 | 7/2006 | Shkedi |
| 7,089,194 | B1 | 8/2006 | Berstis et al. |
| 7,089,322 | B1 | 8/2006 | Stallman |
| 7,120,590 | B1 | 10/2006 | Eisen et al. |
| 7,124,093 | B1 | 10/2006 | Graham et al. |
| 7,194,424 | B2 | 3/2007 | Greer et al. |
| 7,503,070 | B1 | 3/2009 | Alstyne et al. |
| 2001/0020242 | A1 | 9/2001 | Gupta et al. |
| 2001/0034637 | A1 | 10/2001 | Lin et al. |
| 2002/0002509 | A1 | 1/2002 | Wagorn et al. |
| 2002/0010626 | A1 | 1/2002 | Agmoni |
| 2002/0010747 | A1 | 1/2002 | Jaehyuk-Hwang |
| 2002/0010757 | A1 | 1/2002 | Granik et al. |
| 2002/0026351 | A1 | 2/2002 | Coleman |
| 2002/0026390 | A1 | 2/2002 | Ulenas et al. |
| 2002/0032608 | A1 | 3/2002 | Kanter |
| 2002/0042750 | A1 | 4/2002 | Morrison |
| 2002/0047770 | A1 | 4/2002 | Scoggin et al. |
| 2002/0055912 | A1 | 5/2002 | Buck |
| 2002/0082941 | A1 | 6/2002 | Bird |
| 2002/0099602 | A1 | 7/2002 | Moskowitz et al. |
| 2002/0107727 | A1 | 8/2002 | Traub |
| 2002/0111865 | A1 | 8/2002 | Middleton, III et al. |
| 2002/0123924 | A1 | 9/2002 | Cruz |
| 2002/0124253 | A1 | 9/2002 | Eyer et al. |
| 2002/0133404 | A1 | 9/2002 | Pedersen |
| 2002/0143629 | A1 | 10/2002 | Mineyama et al. |
| 2002/0174009 | A1 | 11/2002 | Myers et al. |
| 2003/0006911 | A1 | 1/2003 | Smith et al. |
| 2003/0009762 | A1 | 1/2003 | Hooper et al. |
| 2003/0033199 | A1 | 2/2003 | Coleman |
| 2003/0036944 | A1 | 2/2003 | Lesandrini et al. |
| 2003/0046148 | A1 | 3/2003 | Rizzi et al. |
| 2003/0080997 | A1 | 5/2003 | Fuehren et al. |
| 2003/0154126 | A1 | 8/2003 | Gehlot et al. |
| 2003/0171990 | A1 | 9/2003 | Rao et al. |
| 2004/0015396 | A1 | 1/2004 | Satomi et al. |
| 2004/0054577 | A1 | 3/2004 | Inoue et al. |
| 2004/0204981 | A1 | 10/2004 | Schuebel et al. |
| 2005/0071325 | A1* | 3/2005 | Bem ................ G06F 17/30967 |
| 2005/0091111 | A1 | 4/2005 | Green et al. |
| 2005/0114208 | A1 | 5/2005 | Arbuckle et al. |
| 2005/0249428 | A1* | 11/2005 | Chen .................... H04N 5/147 382/254 |
| 2005/0261965 | A1 | 11/2005 | Eisen et al. |
| 2006/0026147 | A1* | 2/2006 | Cone .................. G06F 16/9535 |
| 2006/0041474 | A1 | 2/2006 | Westling et al. |
| 2006/0064346 | A1 | 3/2006 | Steenstra et al. |
| 2006/0064350 | A1 | 3/2006 | Freer |
| 2006/0069612 | A1 | 3/2006 | Hurt et al. |
| 2006/0069616 | A1 | 3/2006 | Bau |
| 2006/0100923 | A1 | 5/2006 | Courchesne |
| 2006/0119900 | A1 | 6/2006 | King et al. |
| 2006/0184989 | A1 | 8/2006 | Slothouber |
| 2006/0212350 | A1 | 9/2006 | Ellis et al. |
| 2006/0253331 | A1 | 11/2006 | Shkedi |
| 2006/0259357 | A1 | 11/2006 | Chiu |
| 2006/0259359 | A1 | 11/2006 | Gogel |
| 2006/0265283 | A1 | 11/2006 | Gorodyansky |
| 2006/0282303 | A1* | 12/2006 | Hale ..................... G06F 16/36 705/7.11 |
| 2006/0282327 | A1 | 12/2006 | Neal et al. |
| 2006/0282328 | A1 | 12/2006 | Gerace et al. |
| 2006/0284873 | A1* | 12/2006 | Forrest ............. G06F 17/30905 345/440 |
| 2007/0016469 | A1 | 1/2007 | Bae et al. |
| 2007/0016488 | A1 | 1/2007 | Ulenas |
| 2007/0061195 | A1 | 3/2007 | Liu et al. |
| 2007/0072676 | A1 | 3/2007 | Baluja |
| 2007/0078705 | A1 | 4/2007 | Abels et al. |
| 2007/0106658 | A1* | 5/2007 | Ferrari ............. G06F 17/30994 |
| 2007/0162432 | A1* | 7/2007 | Armstrong ........... G06Q 10/107 |
| 2007/0237314 | A1 | 10/2007 | Henry et al. |
| 2008/0040313 | A1 | 2/2008 | Schachter |
| 2008/0104225 | A1 | 5/2008 | Zhang et al. |

(56) References Cited

U.S. PATENT DOCUMENTS

2008/0162399 A1    7/2008   Tam et al.
2008/0195596 A1*   8/2008   Sisk ................. G06F 17/30864
2008/0243607 A1*   10/2008   Rohan .................... G06Q 30/02
                                                                                            705/14.69

* cited by examiner

SYSTEMS AND METHODS FOR TARGETED ADVERTISING

CROSS-REFERENCE TO RELATED APPLICATIONS

The present application claims priority from and is a continuation of U.S. patent application Ser. No. 14/815,796, filed on Jul. 31, 2015, which claims priority from and is a continuation of U.S. patent application Ser. No. 14/257,394, filed on Apr. 21, 2014, now issued as U.S. Pat. No. 9,129,305, which claims priority from and is a continuation of U.S. patent application Ser. No. 13/860,461, filed on Apr. 10, 2013, now abandoned, which claims priority from and is a continuation of U.S. patent application Ser. No. 13/284,799, filed on Oct. 28, 2011, now issued as U.S. Pat. No. 8,443,384, which claims priority from and is a continuation of U.S. patent application Ser. No. 12/098,385, filed on Apr. 4, 2008, now abandoned, which claims priority from U.S. Provisional Patent Application 60/910,581, filed on Apr. 6, 2007, U.S. Provisional Patent Application 60/910,606, filed on Apr. 6, 2007, and U.S. Provisional Patent Application 60/910,583, filed on Apr. 6, 2007. The contents of each of these applications are incorporated by reference herein in their entirety.

BACKGROUND

Advertisements are increasingly being used by web site operators as significant sources of revenue. Advertisements are often provided in the form of banners, textual advertisements, pop-ups, or the like. When a user clicks on an advertisement, the user may be taken to a web site or other network resource that features a product or service highlighted in the advertisement.

Web site owners often contract with advertising partners to display advertisements on the web site owners' web pages. A web page on a web site might, for instance, include advertisements provided by an advertising partner's servers. The advertisements selected by the advertising partner may be randomly selected. Alternatively, the advertisements may be more targeted toward users. For example, advertisements may be selected that closely match one or more keywords listed on the web page the user is viewing or on a web page the user has viewed. Oftentimes, however, the subject matter of these advertisements does not align with the current preferences or interests of the viewer.

SUMMARY OF CERTAIN EMBODIMENTS

Figure 1:
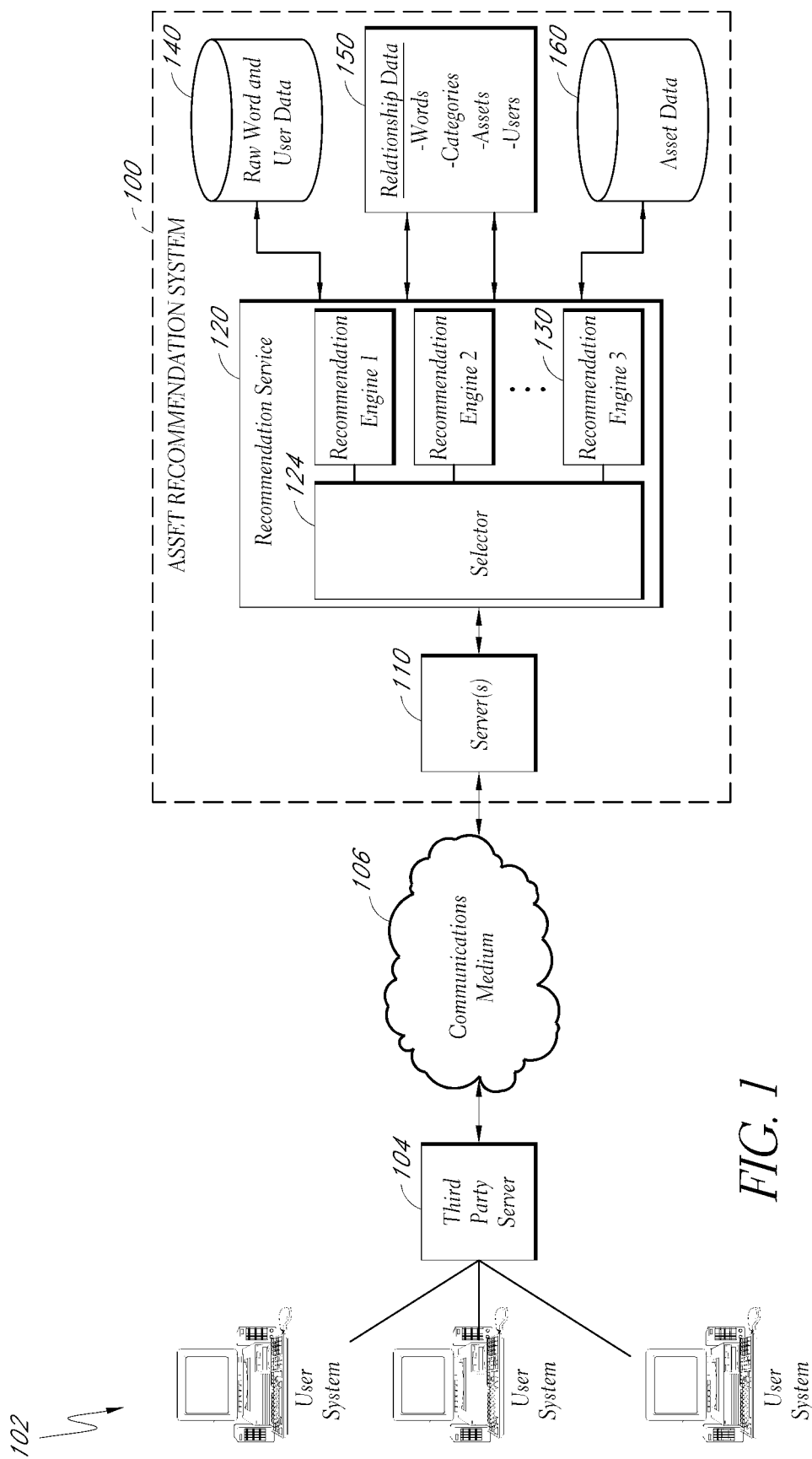
FIG. 1 illustrates a block diagram of an embodiment of an asset recommendation system.

In certain embodiments, a system for generating targeted advertisement recommendations includes a data aggregation module that can obtain word data from social-network data of one or more network resources. The word data can include a plurality of words in the social-network data. The system can further include a relationship mining module in communication with the data aggregation module. The recommender module can create word relationships between selected ones of the plurality of words in the word data to produce relationship data, where each of the word relationships can reflect a degree of association between two or more of the selected words. This degree of association may be based at least in part on one or more of: a frequency of the selected words in the social network data, a recency of a subset of the social-network data that includes the two or more selected words, and an authority factor of the subset of the social-network data. Moreover, the system may include a recommender module in communication with the relationship module, which may access browse information of a target user to identify one or more first words in the target user's browse information, identify the one or more first words in the relationship data, identify one or more second words in the relationship data that have one or more of said word relationships with the one or more first words, and identify one or more advertisements having at least one keyword that corresponds to the one or more second words.

Various embodiments of a computer-implemented method of generating targeted advertisement recommendations include obtaining word data from one or more network resources, where the word data includes words in content of the one or more network resources. The method may further include creating word relationships between selected words in the word data to produce relationship data, each word relationship indicating a degree of association between two or more of the selected words. In addition, in certain embodiments the method includes analyzing browse information of a target user to identify one or more first words in the target user's browse information, identifying, based on the word relationships, second words in the relationship data that are related to the first words in the target user's browse information, identifying one or more advertisements having at least one keyword that corresponds to the second words, and selecting at least a portion of the one or more advertisements from a data repository to provide to the target user.

Additionally, in certain embodiments, a computer-implemented method of determining meanings of ambiguous words includes obtaining word data from one or more network resources, where the word data includes words in content of the one or more network resources. For a subset of the word data, the method further includes determining parts of speech of selected words in the subset of the word data. In addition, the method may include determining definitions of the selected words to determine forms of the selected words and determining one or more categories or related words for each of the word forms. For two selected word forms, the method may also include connecting the two selected word forms in one or more graphs in response to determining that categories or related words of the two selected word forms overlap, where connecting the two selected word forms in the one or more graphs may include creating weighted word relationships between the two selected word forms. Moreover, the method may include determining that a selected graph having a highest total weight of word relationships compared to one or more other graphs indicates definitions of one or more of the selected words in the subset of the word data.

Neither this summary nor the following detailed description purports to define the inventions disclosed herein. Certain inventions disclosed herein are defined by the claims.

DETAILED DESCRIPTION OF EXEMPLARY EMBODIMENTS

Many drawbacks exist with advertising systems that provide advertisements that closely match keywords on a web page. One drawback is that the advertisements provided may merely duplicate content found on the web page. Such advertisements may not be interesting to a user. For example, an advertisement for a Ford® truck displayed on a web page featuring a story about trucks may not entice a user to view the advertisement because the user is already viewing content about trucks.

Another problem with keyword-based methods occurs when advertising partners have small sets of advertisements. In such instances, the keywords on a given web page might correspond poorly to the advertisements in the set because the set is too small to have an advertisement for every possible keyword. The advertisement provided to the user may therefore be so disconnected from the keywords on a web page that the user may have no interest in the advertisement. Yet another problem stems from using relatively small sets of keywords from web pages recently viewed by the user. Because the keywords may be selected from a small portion of the user's browse information, using these keywords may produce advertisements that do not accurately reflect the user's interests.

Certain embodiments herein describe systems and methods for providing targeted advertisements. In certain embodiments, word data and behavioral data of a plurality of users may be mined from network resources such as web sites. This data may be analyzed to detect relationships between words, categories of words, advertisements and other assets, combinations of the same, and the like. Using these relationships, in certain embodiments more targeted advertisements may be provided to a user.

As used herein, the term "asset" is used interchangeably to refer to an asset itself (for example, an advertisement, product, content, persona or profile, and the like) and to its description or representation in a data repository. As will be apparent from the context in which it is used, the term is also sometimes used herein to refer only to the asset itself or only to its representation in the data repository.

The features of these systems and methods will now be described with reference to the drawings summarized above. Throughout the drawings, reference numbers may be re-used to indicate correspondence between referenced elements. The drawings, associated descriptions, and specific implementation are provided to illustrate embodiments of the inventions described herein and not to limit the scope thereof.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. Moreover, the various modules of the systems described herein can be implemented as software applications, hardware and/or software modules, or components on one or more computers, such as servers. While the various modules are illustrated separately, they may share some or all of the same underlying logic or code.

FIG. 1 illustrates an embodiment of an asset recommendation system 100 for recommending assets such as advertisements to users. The asset recommendation system 100 can be owned or operated by an advertisement provider or the like. In certain embodiments, the asset recommendation system 100 provides targeted advertisements to one or more third party servers 104 over a communications medium 106 such as the Internet or other network. In turn, the third party server or servers 104 can provide the advertisements or other assets to one or more user systems 102. In certain embodiments, the advertisements may be advantageously targeted to users of the user systems 102, as will be described below.

The third party server 104 may be operated by a host of a network resource such as a web site or the like. The third party server 104 may, for example, serve content on one or more web pages or other network resources to the user systems 102. In addition to providing content to the user systems 102, the third party server 104 can retrieve or otherwise receive assets from the asset recommendation system 100. These assets may include, for example, one or more advertisements. Other examples of assets are described below.

The asset recommendation system 100 includes one or more servers 110 for communicating with third party servers 104 over the communications medium 106. The servers 110 may be web servers in certain implementations. In response to receiving requests for assets such as advertisements from the third party server 104, in one embodiment the servers 110 request advertisements or other assets from a recommendation service 120.

The recommendation service 120 may be a web service or the like that recommends advertisements or other assets that are targeted to a particular user or group of users. The recommendation service 120 includes one or more recommendation engines 130 for generating these recommendations. In certain embodiments, each recommendation engine 130 provides recommendations in different ways, such as by analyzing the context of a target user's browse information or history, by analyzing the behavior of a target user, by targeting a target user demographically or geographically, by analyzing social and/or user momentum, combinations of the same, and the like. A selector module 124 can determine which of the recommendations generated by the recommendation engines 130 to provide to the third party server 104 for display to a user via a user system 102.

One or more of the recommendation engines 130 may include components (see, for example, FIG. 2) for mining data from remote network resources such as web sites. These components may mine data by crawling or otherwise retrieving the data in certain embodiments. In certain embodiments, the data mined by the recommendation engines 130 may include word data, user behavioral data, user tracking data, combinations of the same, and the like. Word data can include, for example, words and phrases found in the content of network resources such as web pages.

In certain embodiments, the word data is advantageously mined from social-network data. In addition to having its broad ordinary meaning, "social-network data" may include data generated on social sites such as social networking sites, blogs, declared interest sites (for example, digg.com), news and other current event sites. In addition, social-network data may include web conversations, user profiles, online blogs, commentary, and the like. Word data may also be mined from reference data such as may be obtained from dictionary and encyclopedia sites, directories, search engines, combinations of the same, and the like. Because a large variety of words can be mined from such diverse network resources in certain embodiments, relationships can be detected between the word data that facilitate providing more accurately targeted asset recommendations, as will be described below.

User behavioral data may include data on browse behavior, asset selection behavior, and/or purchase behavior of one or more of users. Browse behavior data can include data on network resources accessed by users. Asset selection behavior data may include data regarding advertisements and other assets selected (for example, clicked) by users. Purchase behavior data may include data regarding online purchases of products and/or services by users. User tracking data may include data relating to a target user, who may be a user of a user system 102 for whom recommended advertisements will be generated. The user tracking data for a particular user may include data regarding a recent browse or purchase history of the user, demographic data on the user, geographic data related to the user (for example, a locale in which the user lives), combinations of the same, and the like.

In certain embodiments, one or more of the recommendation engines 130 store the mined data as raw data in a data repository 140, which may be a storage device, database, or the like. The raw data may be mined by the recommendation engines 130 in an off-line process or in a process that may operate in parallel or substantially in parallel with processes for providing recommendations to users. The recommendation engines 130 may mine the raw data, for example, on a periodic basis (for example, daily), or the recommendation engines 130 may mine the raw data continuously or substantially continuously.

Certain components of one or more recommendation engines 130 (see, for example, FIG. 2) may analyze the raw data to detect or create relationships among the raw data. The recommendation engines 130 may analyze the raw data stored in the data repository 140. Alternatively, the recommendation engines 130 may analyze raw data directly as it is being mined. The relationships created by the recommendation engine 130 may be stored as relationship data 150. Many types of relationships may be created by the recommendation engines 130. Word relationships may be created, for instance, between words in the word data. Other types of relationships may also be created, as is described below with respect to FIG. 2.

Because the word data may be mined from social sites, reference sites, and the like, the word relationships may reflect associations made on social sites, reference sites, and the like. For instance, an analysis of the word data may detect that the word "Ford®" is related to the word "barbeque" because these words are used in similar contexts by bloggers. Thus, a word relationship may be created between "Ford®" and "barbeque."

The recommendation engines 130 may use the relationship data 150 to generate targeted recommendations. In certain embodiments, one or more recommendation engines 130 retrieve user tracking data for a target user from the data repository 140. The recommendation engines 130 may analyze the user tracking data to find words in the tracking data. For example, one recommendation engine 130 may search for target words on a network resource that the user has recently accessed. The likely contextual meanings of the target words may be determined, for example, by the process of FIG. 6 described below. Using the target words, the recommendation engines 130 can find related words in the relationship data 150.

In turn, using the related words, the recommendation engines 130 can find related assets in the relationship data 150. The recommendation engines 130 can find related assets in the relationship data 150 by comparing the related words with keywords associated with one or more assets in the asset data 160. These keywords may be associated with the assets in a separate or off-line process, which may be performed, for example, by the recommendation service 120. In alternative embodiments, the keywords can be manually associated with at least some of the assets. An administrator of the asset recommendation system 100, for instance, may analyze the assets and assign keywords by hand. Categories may also be assigned to the assets manually or automatically by inferring the categories from the assigned keywords (see, e.g., FIG. 2).

The recommendation service 120 may perform the keyword-asset associations by analyzing descriptive text of the assets to extract keywords. For instance, the recommendation service 120 might extract keywords such as "truck" and "Ford®" from an advertisement asset that describes Ford® trucks. More details on this extraction process are described below with respect to FIG. 6. The keywords can also be weighted, for example, based on a part of speech of a word (for example, nouns may be weighted higher than verbs), based on a frequency of the word's use in the asset description, based on a relative position of the word in the descriptive text (for example, words higher in the descriptive text may be weighted more), combinations of the same, and the like.

By determining which words are related to the words found in the user's data, the recommendation engine 130 may therefore determine which assets may be candidate recommendations for the target user. The recommendation engines 130 can score or otherwise rank the asset recommendations based at least in part on the strength of word, asset, or other relationships in the relationship data 150.

The recommendation engines 130 may recommend one or more assets stored in a data repository 160, which may include a database of assets. The data repository 160 can include, for example, content related to advertisements, content describing products, content related to other users, such as user profiles, combinations of the same, and the like. Thus, while the remainder of this specification generally refers to recommending advertisements, other assets may also be recommended to users.

In certain embodiments, one or more of the recommendation engines 130 provides their candidate recommendations to the selector 124. The selector 124 can select a subset of assets to provide to the third party server 104, by, for example, selecting a most highly ranked or scored subset of the assets. The selector 124 can provide the subset of assets to the third party server 104. The third party server 104 may output an asset for display for one or more of the user systems 102.

Although the third party server 104 is provided in the depicted embodiment, the third party server 104 may be removed in other embodiments. As such, the user systems 102 may directly access the asset recommendation system 100 in certain embodiments.

Although the assets described herein are primarily referred to as including advertisements, assets may also include products (or services), content, personas, and the like. Product assets may include descriptions of products, which may be recommended, for example, to a user of a product network resource or web site that sells the given product. Content assets can include news stories, blogs, or the like, which may be recommended to users. Persona assets can include profiles of people that may be recommended, for example, on social networking sites, dating services, and the like. The remainder of this specification will refer primarily to advertisement assets; however, some or all of the systems, modules, and processes described herein may be used to provide product, content, persona, and other types of asset recommendations.

Figure 2:
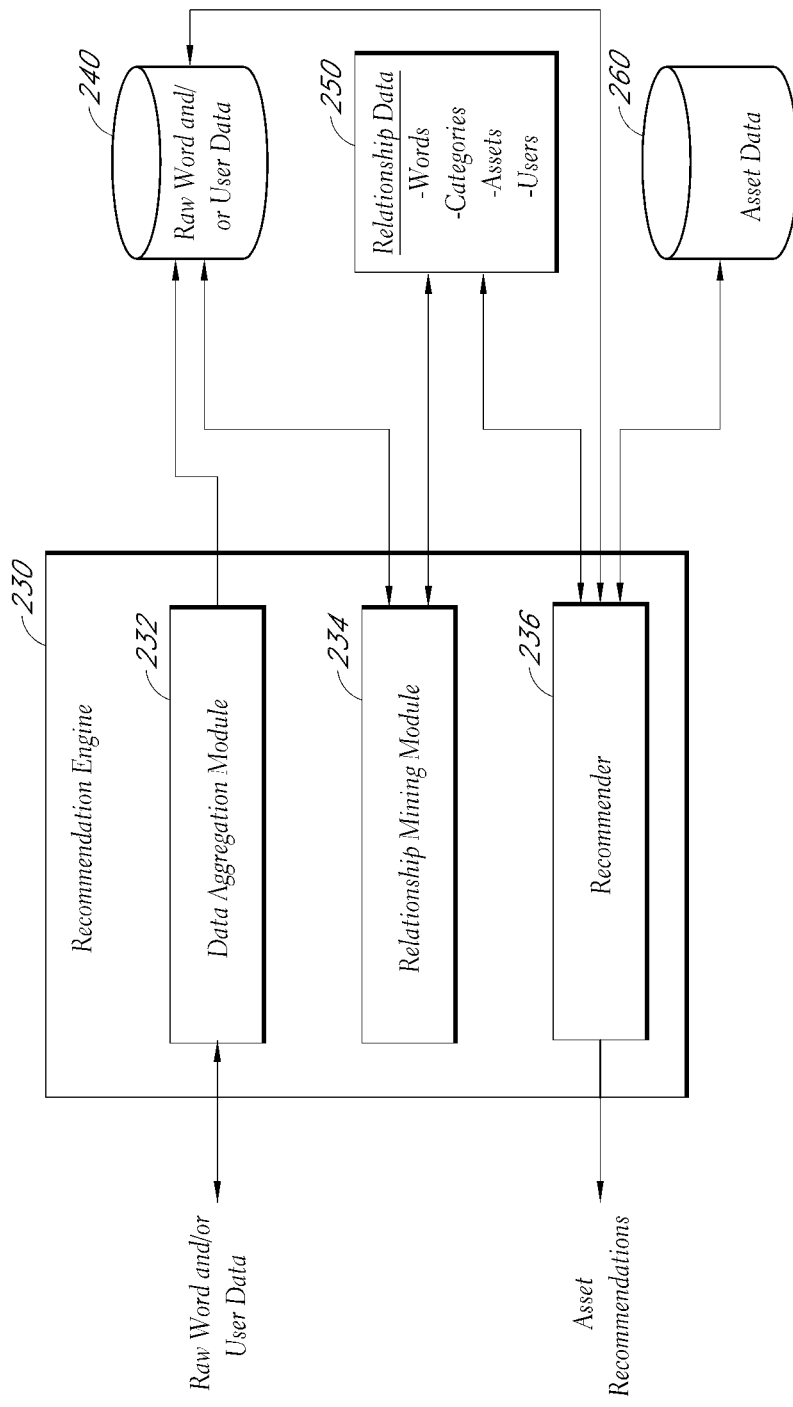
FIG. 2 illustrates a block diagram of an embodiment of a recommendation engine of the asset recommendation system of FIG. 1.

FIG. 2 illustrates a more detailed embodiment of a recommendation engine 230. The recommendation engine 230 includes a data aggregation module 232, a relationship mining module 234, and a recommender 236. The recommendation engine 230 may use these components to mine data, analyze the data to detect relationships among the data, and generate asset recommendations based on the detected relationships.

In certain embodiments, the data aggregation module 232 is configured to mine raw word and/or user data obtained from social and/or reference network resources. For example, in certain embodiments, the data aggregation module 232 crawls a network such as the Internet to obtain this data. Alternatively, the data aggregation module 232 can receive this data from external sources. The data aggregation module 232 can store the raw data in a data repository 240, which may be a database or the like.

As described above with respect to FIG. 1, an asset recommendation system may include multiple recommendation engines. These recommendation engines 230 may have the same general structure as the recommendation engine 230 in certain embodiments, but the components of the recommendation engines 230 may have different functions. For example, the data aggregation module 232 of one implementation of a recommendation engine 230 may gather word data but not user data, whereas a data aggregation module 232 of another recommendation engine 230 might gather user data but not word data. Still other data aggregation modules 232 gather both word data and user data. More specific examples of recommendation engines 230 are described below with respect to FIG. 8.

A relationship mining module 234 may access the word and/or user data stored in the data repository 240 and detect or create relationships among the data. Many types of relationships may be created, including word, category, asset, and behavioral or user-based relationships.

In certain embodiments, the relationship mining module 234 detects word relationships by analyzing the proximity of certain words to other words on a given network resource such as a web site. For example, if a blogger includes the words "backgammon" and "bird watching" in the same sentence or within the same passage of text, the relationship mining module 234 may create a word relationship between these words. The relationship mining module 234 may also create word relationships based on interactions between users with respect to one or more network resources. For example, if a social site has a user "Bob" and Bob likes video games, and if Bob has a friend Joe who likes skydiving, then the relationship mining module 234 may create a word relationship between "video games" and "skydiving."

The relationship mining module 234 may store the relationships in a network or graph data structure. In certain embodiments, a separate graph data structure may be created for each type of relationship. The graph data structure may be implemented in numerous ways, including but not limited to, arrays, adjacency lists, adjacency matrices, symbolic graphs, database, combinations of the same, and the like. The graph data structures may include weighted Bayesian networks, Markov networks, or the like. The graph data structures may have nodes representing words, categories, assets, or user data. A relationship between two items of data may be indicated by an edge connecting two nodes.

Figure 3A:
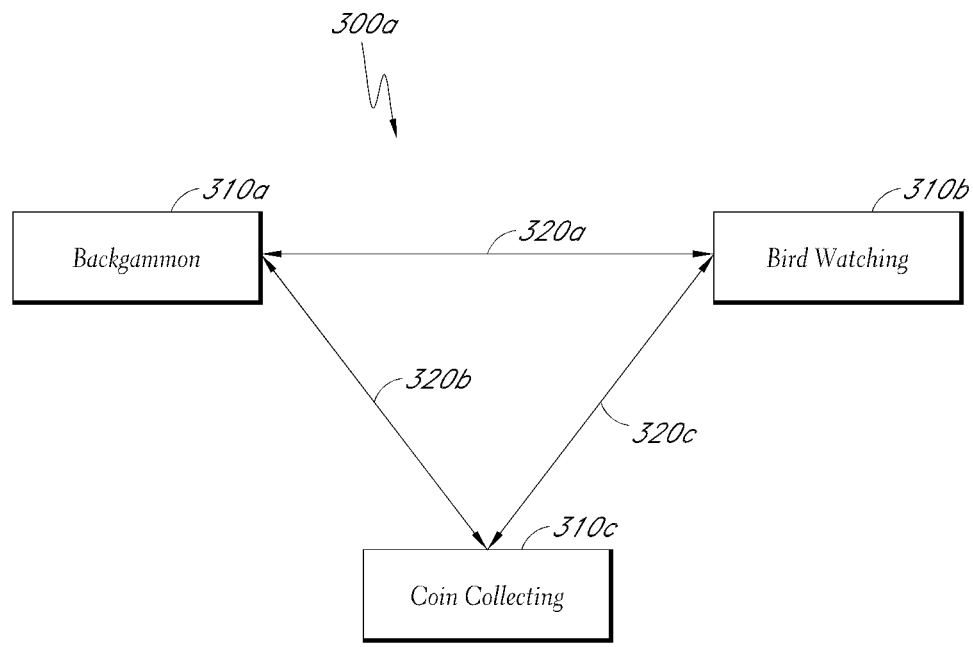
FIG. 3A illustrates example word relationships created by an embodiment of the recommendation engine of FIG. 2.

Referring to the "backgammon" example above and with reference to FIG. 3A, the relationship mining module 234 may construct an example graph 300a having a backgammon node 310a and a bird watching node 310b. An edge 320a connects the nodes 310a and 310b, indicating a relationship between backgammon and bird watching. As shown, the relationship mining module 234 in the depicted example has also determined that the words "coin collecting" are related to both backgammon and bird watching. Thus, a node 310c for coin collecting is added to the graph 310a, with edges 320b and 320c connecting the nodes 310a and 310c and the nodes 310b and 310c, respectively. While the graph 300a illustrates a simple example of relationship data, much more complex graph structures can be constructed having millions or more nodes 310 and edges 320.

The relationship mining module 234 in certain embodiments can weight or rank the relationships between words. In embodiments where the relationship data 250 includes graph structures or the like, these weightings can be represented as weightings of the edges 320 connecting the nodes 310. In certain embodiments, the weightings may be based on criteria such as frequency or popularity of certain relationships, recency of relationships, and/or authority of relationships. Frequency of relationships can refer to a number of times and/or a number of distinct sites or passages in which a relationship is detected between particular words. If many users of network resources such as social sites are describing backgammon in conjunction with bird watching, for instance, the word relationship between backgammon and bird watching may receive a higher weighting.

Recency of relationships can refer to how recently the words were published or otherwise provided on network resources. More recent relationships may be given greater weight than older relationships. If users were discussing coin collecting and backgammon within the past few weeks, for example, the weight of this relationship might be higher than if users were discussing the same words several months or years ago. Authority of relationships can refer to the authority of users or network resources from which the relationships are derived. Higher authority can result in a higher weighting. To illustrate, relationships derived from words on an anonymous comment on a blog entry might be considered to have little authority, whereas relationships derived from words in a reference work such as a dictionary might have greater authority and hence more weight.

Some or all of the frequency, recency, and authority criteria may be used to weight the relationships. In certain embodiments, the weightings of relationships dynamically change over time based on changing frequency, recency, and/or authority criteria. Thus, final recommendations generated based on the same relationships might be different at different points in time. In an embodiment, using some or all of these changing criteria may effectively weight relationships according to social trends or social momentum. Relationships that are more frequent (for example, popular), recent, and/or which have more authority might reflect a degree of social momentum that the relationship has. In certain embodiments, recommendations can be generated based on relationships having greater social momentum than other relationships, resulting in timely, targeted recommendations.

As one example of weighting word relationships, authority of social sites may be first determined manually by an administrator. The administrator might determine, for instance, that blogging sites are generally more credible or have more authority than other social sites such as Myspace®, Facebook®, or the like. A sample set of social-network data may be taken based on the activity of users of those sites. The sample set of social-network data might include, for example, data created by between 10,000 and 50,000 users. These users may be selected based at least in part on the level of activity on their respective social sites. This level of activity corresponds to the recency factor in certain embodiments. With the sample set of social-network data obtained, word data can be extracted from the social-network data and word relationships may be created as described above. The frequency of the occurrence of words within the social-network data may be used to further weight the word relationships.

As social momentum can change over time, relationships may be strong at one point in time and then become weak, or vice versa. For example, if many users of social sites, news sites, or the like are talking about backgammon and bird watching, social momentum might be high. Years, months, or even days later, users may lose interest in these topics and the social momentum might decrease significantly. Recommendations can be automatically adjusted accordingly in certain instances to provide fewer recommendations related to relationships with decreased social momentum. For example, the weightings of the relationships may be aged or decreased, so that more recent relationships may have higher weightings, which may result in more recent relationships being used to generate recommendations.

In addition to detecting word relationships, in certain embodiments, the relationship mining module 234 of FIG. 2 can also detect and create category relationships. In certain embodiments, the relationship mining module 234 infers category relationships from word relationships. To do this, the relationship mining module 234 may access category data from the data repository 240. This category data may be obtained by the data aggregation module 232 by, for example, using linguistic categorizations, which may be obtained from online dictionaries, such as wordnet.princeton.edu, or other like online reference resources. The data aggregation module 232 may also obtain the category data from societal categorizations, which may be obtained from directory sites that arrange topics in hierarchical category form, such as dmoz.org. Creating relationships between categories can allow generalized concepts to be related. When generating recommendations, the recommendation engine 230 can use the category relationships to find related assets if no assets exist that are related to a word relationship.

Figure 3B:
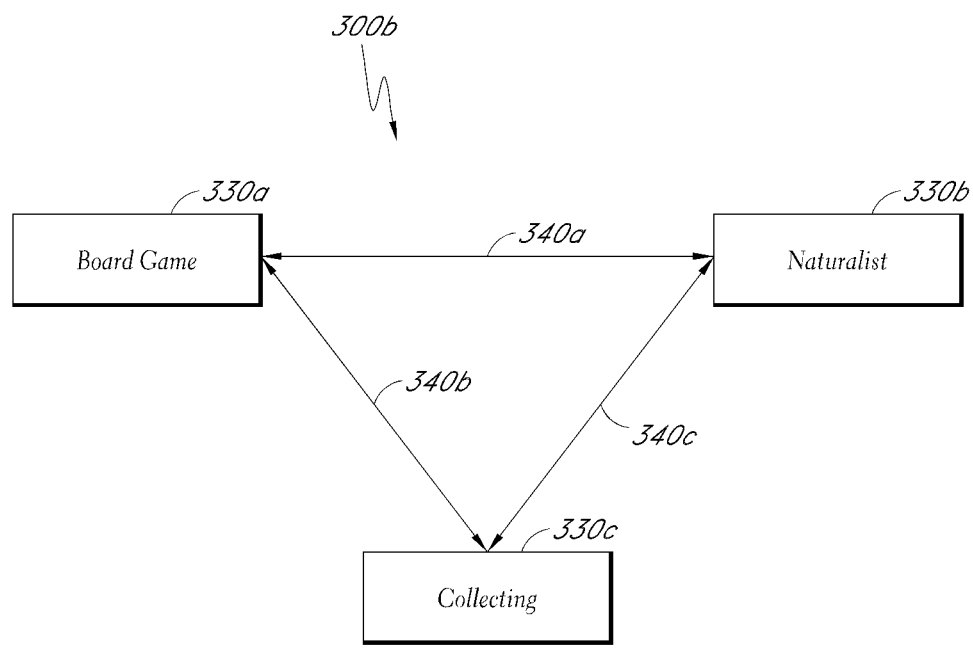
FIG. 3B illustrates example category relationships created by an embodiment of the recommendation engine of FIG. 2.

Referring to FIG. 3B, categories for the words in FIG. 3A are shown with inferred category relationships. Thus, a "board game" node 330a, a possible category for backgammon, is shown related to a "naturalist" node 330b, a possible category for bird watching. Likewise, a "collecting" node 330c, a possible category for "coin collecting," is shown related to the nodes 330b, 330c. Edges 340a, 340b, and 340c connect the nodes 330a, 330b, and 330c.

Referring again to FIG. 2, the relationship mining module 234 may also infer asset relationships from category relationships. To do this, the relationship mining module 234 may access asset data from a data repository 260. This asset data may include keywords for each asset, as described above with respect to FIG. 1. In addition, the asset data can include one or more categories for each keyword, which may be obtained, for example, by analyzing reference data in a similar manner to the category inferences described above. To infer asset relationships from category relationships, the relationship mining module 234 may determine which categories in the category relationships overlap with categories of assets in the asset data.

Figure 4A:
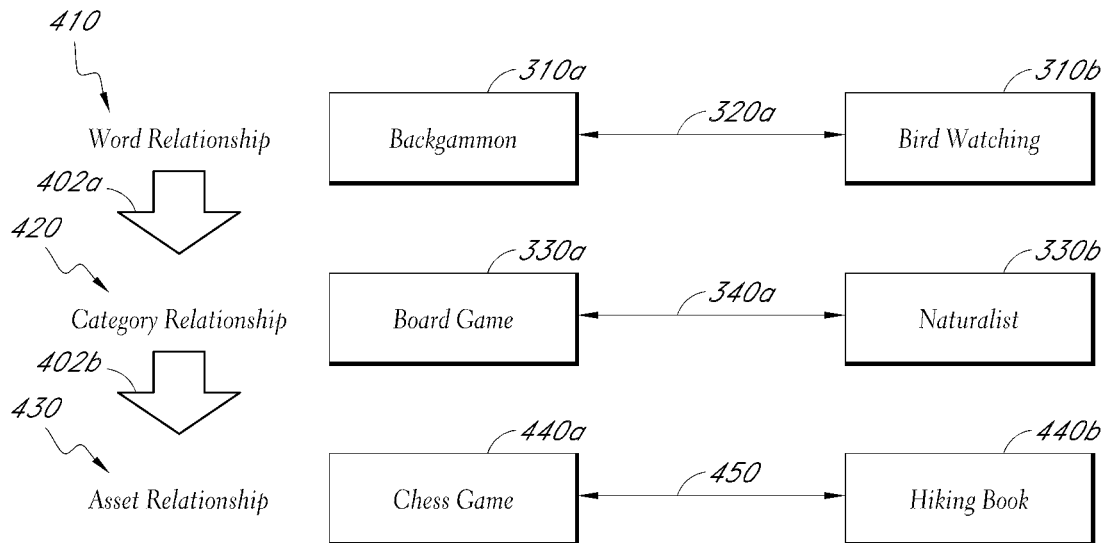
FIGS. 4A and 4B illustrate example asset, word, and category relationships created by an embodiment of the recommendation engine of FIG. 2.

For example, with reference to FIG. 4A, an inference from a word relationship 410 to a category relationship 420 is illustrated by arrow 402a. In addition, the inference of an asset relationship 430 from the category relationship 420 is illustrated by arrow 402b. In the depicted example, the assets include an advertisement for a "chess game" at node 440a, which can be inferred as being related to the category "board game." The assets further include an advertisement for a "hiking book" at node 440b, which can be inferred from the category "naturalist." An edge 450 connects the nodes 440a, 440b, reflecting the inferred relationship between the chess game advertisement and the hiking book advertisement.

Turning again to FIG. 2, the relationship mining module 234 may also generate asset relationships directly. Asset relationships may be created by analyzing user browse data and/or reference data. As an example of analyzing user browse data, the relationship mining module 234 may relate two product assets because a user viewed one product and then soon after viewed the second product. As an example of analyzing reference data, the relationship mining module 234 may relate an advertisement asset to a content asset because both the advertisement and the content contain the same or similar dictionary words.

Figure 4B:
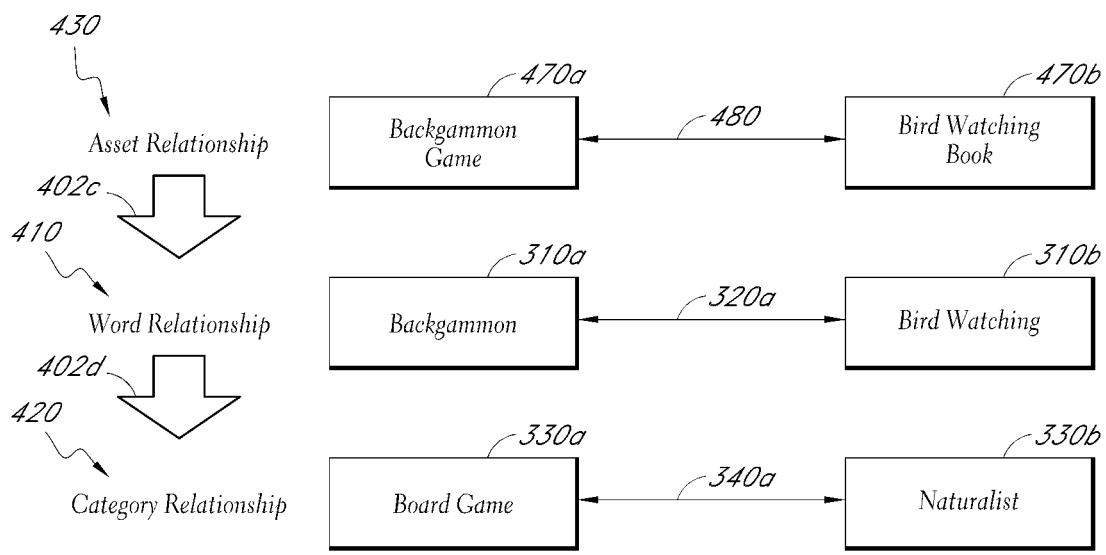

From these directly created asset relationships, the relationship mining module 234 may also infer word relationships from the assets and in turn infer category relationships from the word relationships. The relationship mining module 234 may infer word relationships by retrieving words in the related assets. Once the word relationships are created, the relationship mining module 234 may create the category relationships. For example, FIG. 4B illustrates that an asset relationship 430 may be created between an advertisement for a backgammon game at node 470a and a bird watching book at 470b. Arrow 402c indicates that an inference may be made that the word "backgammon" at node 310a is related to the words "bird watching" at node 310b. Arrow 402d further indicates that an inference may be made that the category "board game" at node 310a may be related to the category of "bird watching" at node 310b.

Turning again to FIG. 2, a recommender 236 of the recommendation engine 230 may use the relationship data 250 to generate targeted recommendations. In certain embodiments, the recommender 236 can retrieve user tracking data for a target user from the data repository 240. The recommender 236 may analyze the user tracking data to find words in the tracking data and find related words in the relationship data 250. The recommender 236 may then use the related words to find related assets in the relationship data 250. The recommender 236 can recommend one or more of these assets for a target user. The recommender 236 may also use other recommendation generation techniques, some examples of which are described below with respect to FIG. 8.

Figure 5A:
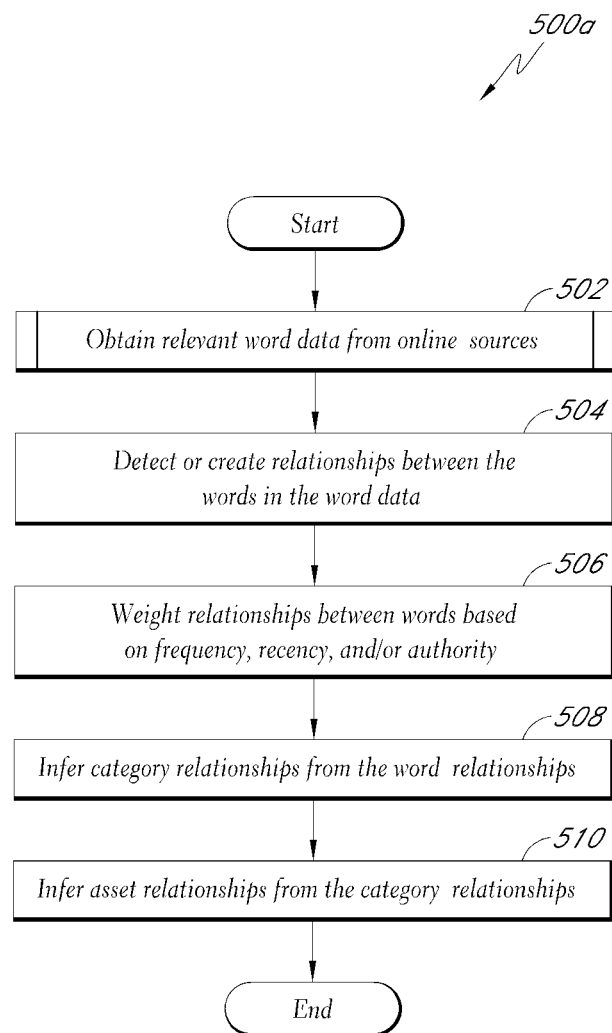
FIGS. 5A and 5B illustrate embodiments of processes for creating relationship data using certain embodiments of the recommendation engine of FIG. 2.

FIG. 5A illustrates an embodiment of a relationship creation process 500 for creating word relationships based on word data obtained from various network resources. The process 500a may be implemented by the asset recommendation system 100 or by the recommendation engine 230 in certain embodiments. The process 500a facilitates detecting relationships between words that can be used to generate recommendations for users.

At block 502, relevant word data is obtained from online sources. Block 502 may be implemented, for example, by the data aggregation module 232.

The word data can be obtained from social texts, reference texts, and the like. Relevant words can be extracted from the online sources. These relevant words may include nouns and verbs in certain embodiments. A process for detecting relevant words from possibly less relevant words is described below with respect to FIGS. 6 and 7.

At block 504, relationships between the words in the word data can be detected or created. This block 504 may be implemented, for example, by the relationship mining module 234. The relationships may be created in the form of a graph or other network data structure. The relationships may be created by analyzing the proximity of the words in the word data, by analyzing user online browse and purchase behavior, and the like. These relationships are weighted at block 506 based on one or more of frequency, recency, and/or authority.

Continuing at block 508, category relationships are inferred from the word relationships, using for example, the relationship mining module 234. In turn, asset relationships are inferred from the category relationships at block 510. The connections between word relationships and asset relationships may be used to generate recommendations, as described above.

In various alternative embodiments, certain of the blocks are not included in the process 500a. For example, any of blocks 506-510 might not be included in some implementations of the process 500a.

Figure 5B:
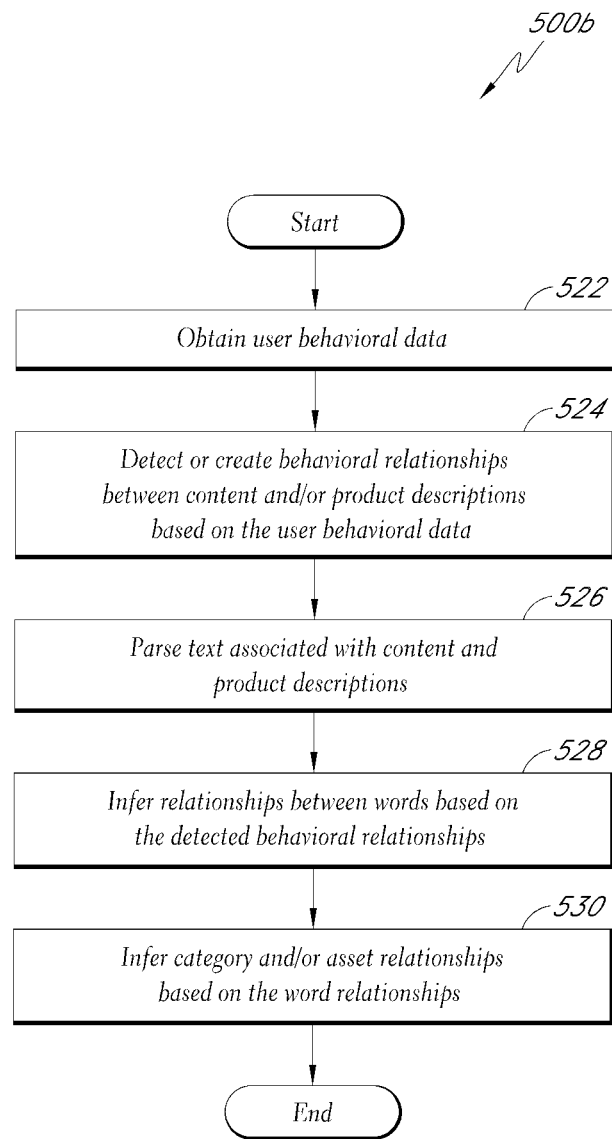

FIG. 5B illustrates another embodiment of a relationship creation process 500b. The process 500b creates word relationships based on user behavioral data obtained from various network resources. The process 500b may be implemented by the asset recommendation system 100 or by the recommendation engine 230 in certain embodiments. The process 500b facilitates detecting behavioral relationships and in turn detecting word and other relationships, which may be used to generate recommendations for users.

At block 522, user behavioral data is obtained. User behavioral data may include user browse behavior, purchase behavior, and the like. Browse behavior can include a record or history of network resources viewed or accessed by users. Purchase behavior can include a record or history of products purchased by users.

At block 524, behavioral relationships between content and/or product descriptions are detected or created based on the user behavioral data. A behavioral relationship between two pieces of content (e.g., the content of a network resource) might be detected if a user views or accesses one piece of content and then subsequently views or accesses another. The proximity in time between accesses of the different pieces of content or products might be used to weight the behavioral relationship created. For example, if a user accesses a web page describing sports cars and then accesses a web page describing stocks, a behavioral relationship might be created between the content of these web pages.

Similarly, a purchase-based behavioral relationship may be created if a user purchases a product from a network resource and subsequently purchases another product from a network resource. Or a purchase-based behavioral relationship may be created if a user simultaneously purchases two or more products from a network resource.

At block 526, text associated with content and product descriptions is parsed or otherwise analyzed. For a given behavioral relationship created at block 524, the associated content or product descriptions can be parsed to obtain word data from the content or product descriptions. At block 528, relationships between words in the content or product descriptions are inferred based on the detected behavioral relationships. Using the example of the content-based behavioral relationship of a sports car page and a stocks page, words from each page might be related to each other. For instance, the words "sports car" might be related to the word "stocks."

At block 530, category and/or asset relationships are inferred based on the word relationships. These category and asset relationships may be inferred as described above. However, in certain alternative embodiments, the block 530 might be omitted from the process 500b.

Figure 6:
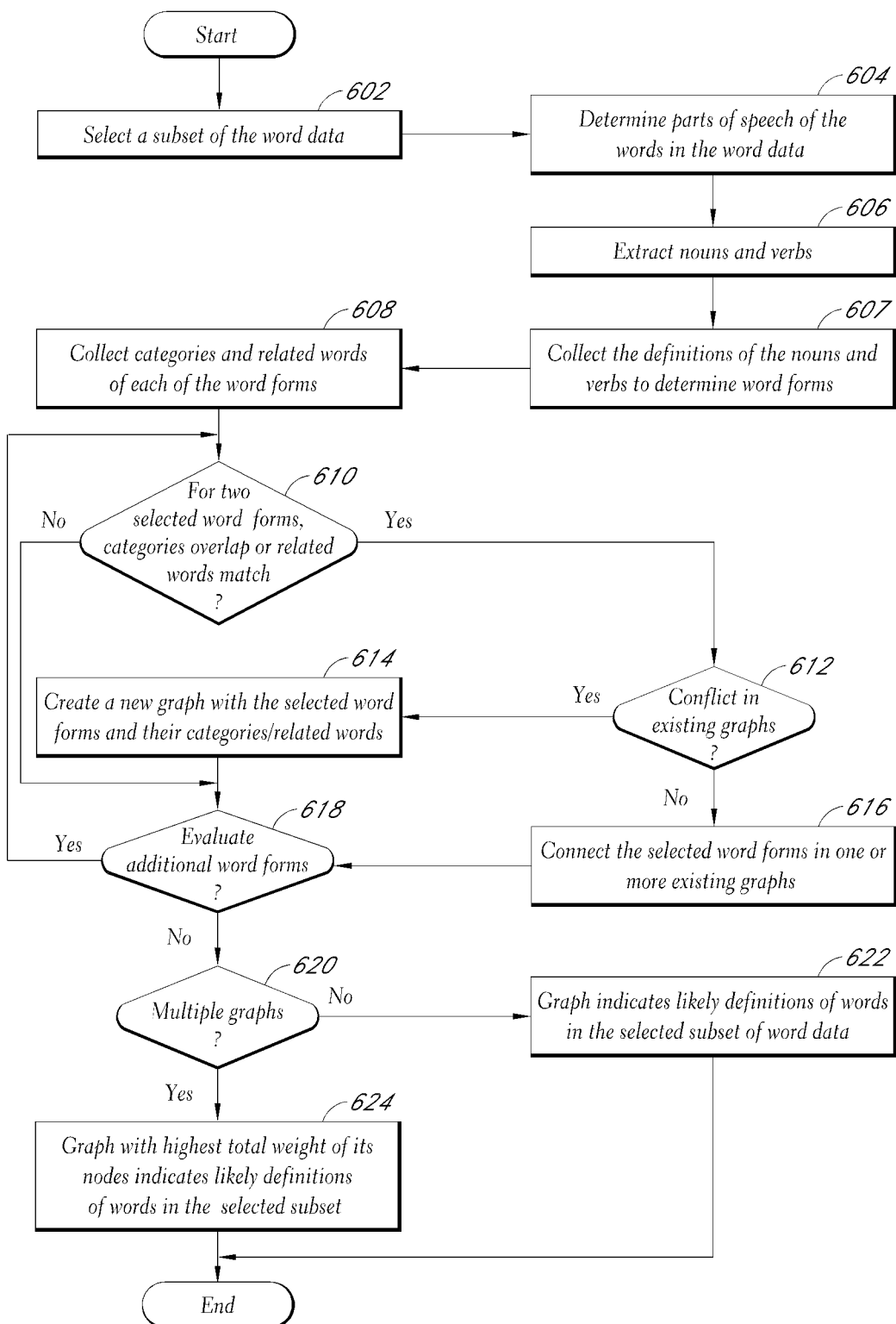
FIG. 6 illustrates a flowchart of an embodiment of a process for obtaining relevant word data using an embodiment of the recommendation engine of FIG. 2.

FIG. 6 illustrates an embodiment of a (name?) process 600 for extracting relevant words from word data, such as social-network data. The process 600 in certain embodiments facilitates finding relevant words, determining their meanings, and categorizing the words. The process 600 may be used, for example, to determine relevant words from social-network or reference data to facilitate the creation of correct word relationships. In addition, the process 600 may be used to extract and determine correct meanings for keywords in asset descriptions. Moreover, the process 600 may be used to extract relevant keywords from a target user's browse information so that contextual recommendations may be generated for the correct contexts or meanings of the keywords. The process 600 may be implemented by the relationship mining module 234 or, more generally, by the recommendation service 120 or 820 (see FIG. 8).

One problem in building an effective set of relationship data is parsing the source text (for example, from social and reference sites) and extracting the relevant words. Creating relationships between all the words in a body of text may be of little use, as many words are very commonly used (such as the articles "a," "an" and "the"). The process 600 in certain embodiments extracts relevant "signal" words, which may include nouns and verbs, and ignores less relevant "noise" words, which may include words other than nouns and verbs. In certain embodiments, signal words may also include adjectives, adverbs, and other parts of speech.

At block 602 a subset of the word data is selected. As described above, the word data may be obtained by the data aggregation module 232. In an embodiment, a relatively small subset of this word data is selected. This small subset may be a sentence or the like. In alternative embodiments, larger chunks of word data, such as paragraphs, may be selected. The process 600 may repeat in certain embodiments to analyze additional subsets of word data. The detection of sentences may be performed by natural language processing techniques, such as maximum entropy processing techniques, and/or by detecting particular characters such as periods, quotation marks, paragraph breaks, line breaks, and the like.

At block 604, parts of speech of the words in the word data are determined. In an embodiment, these parts of speech may include adjectives, verbs, nouns, articles, and the like. The determination of which parts of speech are used in a given subset of word data may also be performed by natural language processing techniques, such as maximum entropy processing techniques.

Once the parts of speech are identified, nouns and verbs may be extracted at block 606. Nouns and verbs may be extracted in certain embodiments because these words may be more relevant than adjectives, articles, and the like. However, in alternative embodiments, certain adjectives, adverbs, or other parts of speech may also be extracted and used to generate word relationships.

Certain nouns and verbs can have several different meanings or word forms depending on their context. For example, the sentences "The crickets are chirping" and "Let's play cricket" both use the noun "cricket," but one sentence refers to an insect and the other to a sport. In order to create proper relationships between the words in each sentence, it can be desirable to obtain the proper meaning of the words. While maximum entropy techniques may be used for this task, such techniques may require large amounts of training data to properly learn the definitions of words. In certain embodiments, the proper contextual meanings of the extracted words may be determined more efficiently using the remainder of the process 600.

At block 607, the definitions of the nouns and verbs may be obtained, for example, from online reference sites. The definitions may also be obtained from off-line reference works, such as a dictionary or encyclopedia application. These definitions may be retrieved from a data repository, such as the repository 140 or 240. By collecting definitions of the nouns and verbs, word forms for the nouns and verbs may be determined. Each word form can correspond to a definition of a word.

At block 608, categories and related words of each of the word forms are collected. The related words can be synonyms, sister terms, or the like. For an example sentence "let's get the bat and the ball and play cricket," categories for the nouns and verbs may be obtained as follows:

Bat/mammal/vertebrate/animal
Bat/sports equipment/equipment
Cricket/insect/invertebrate/animal
Cricket/outdoor game/sport/activity
Ball/sport equipment/equipment
Ball/dance/social event Thus, for example, one word form for the noun "bat" is in the category "mammal," which is a subcategory of the category "vertebrate," which is a subcategory of the category "animal." Another word form for the noun "bat" is in the category of "sports equipment," which is a subcategory of the category "equipment."

Although not shown in the example above, related words may also be obtained. One example of a related word to the category of "sports equipment" is the word "sport." The categories of these related words may further be obtained. The word "sport" may be in the category of "sports," for instance.

At decision block 610, for two selected word forms, it may be determined whether categories of those word forms overlap or if any related words overlap. For example, the category "animal" is found in both the word form bat/mammal/vertebrate/animal and in the word form cricket/insect/invertebrate/animal. If categories between two word forms overlap, the process 600 proceeds to block 612; otherwise, the process proceeds to block 618.

Figure 7A:
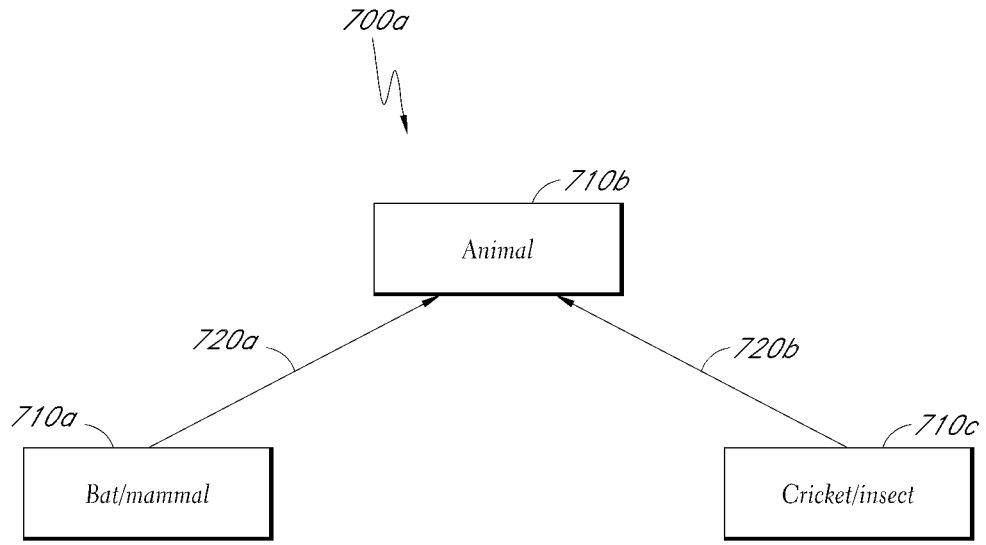
FIGS. 7A and 7B illustrate example graphs generated using an embodiment of the process of FIG. 6.

At decision block 612, it may further be determined whether there is a conflict in an existing graph, as will be explained below. If not, a new graph may be created at block 614. The new graph can have the selected word forms and their categories and/or related words. FIG. 7A illustrates an example graph 700a generated between the word forms bat (a mammal) and cricket (an insect). A node 710a for bat/mammal and a node 710c for cricket/insect are joined by edge nodes 720a, 720b with an animal node 710b.

The relationships between nodes 720a, 720b, 720c can be weighted in certain embodiments based on the strength of the words in the originating text (for example, web page or other network resource). This strength can be gauged by several factors, including the frequency of words in the original text, the precision of the words, the proximity of the words, and/or the overlap of related words in the definitions of the words. The precision of words factor can refer to the number of categories a word is found in. For example, the categorization of the word "baseball" may be "outdoor sport/sport/activity." As this word has three levels of categorization, it may be considered relatively precise. In contrast, the word "sport" may have a categorization of "activity." With one level of categorization, this word may be considered less precise.

Figure 7B:
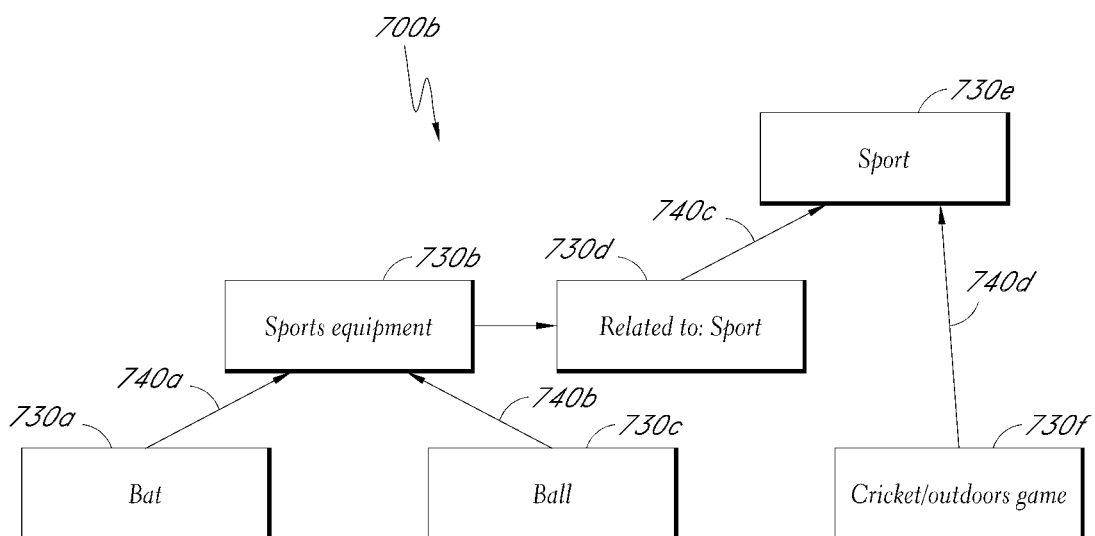

Returning to FIG. 6, if there is no conflict in an existing graph, the selected word forms are connected into an existing graph at block 616. A conflict might exist, for example, if the word "bat" already existed in a graph under a different (non-overlapping) category. This block 616 can further include weighting the new connections in the existing graph. At decision block 618, it may be further determined whether to evaluate additional word forms. If word forms are remaining to be analyzed, the process 600 may loop back to decision block 610. Otherwise the process 600 may proceed to block 618. Blocks 610 through 618 may be iterated until all or substantially all words in the subset of words are analyzed and assigned into graphs. FIG. 7B illustrates a second example graph 700b having the remaining word forms described above, having nodes 730 and edges 740.

At decision block 620 of FIG. 6, it may be further determined whether multiple graphs were generated by the previous blocks. If not, at block 622 it is determined that the single generated graph likely includes the correct contextual definitions of the words in the selected subset of word data. Otherwise, at block 620, it is determined that the graph with the highest total weight of its nodes likely indicates the proper contextual definitions of the words in the selected subset of word data.

Figure 8:
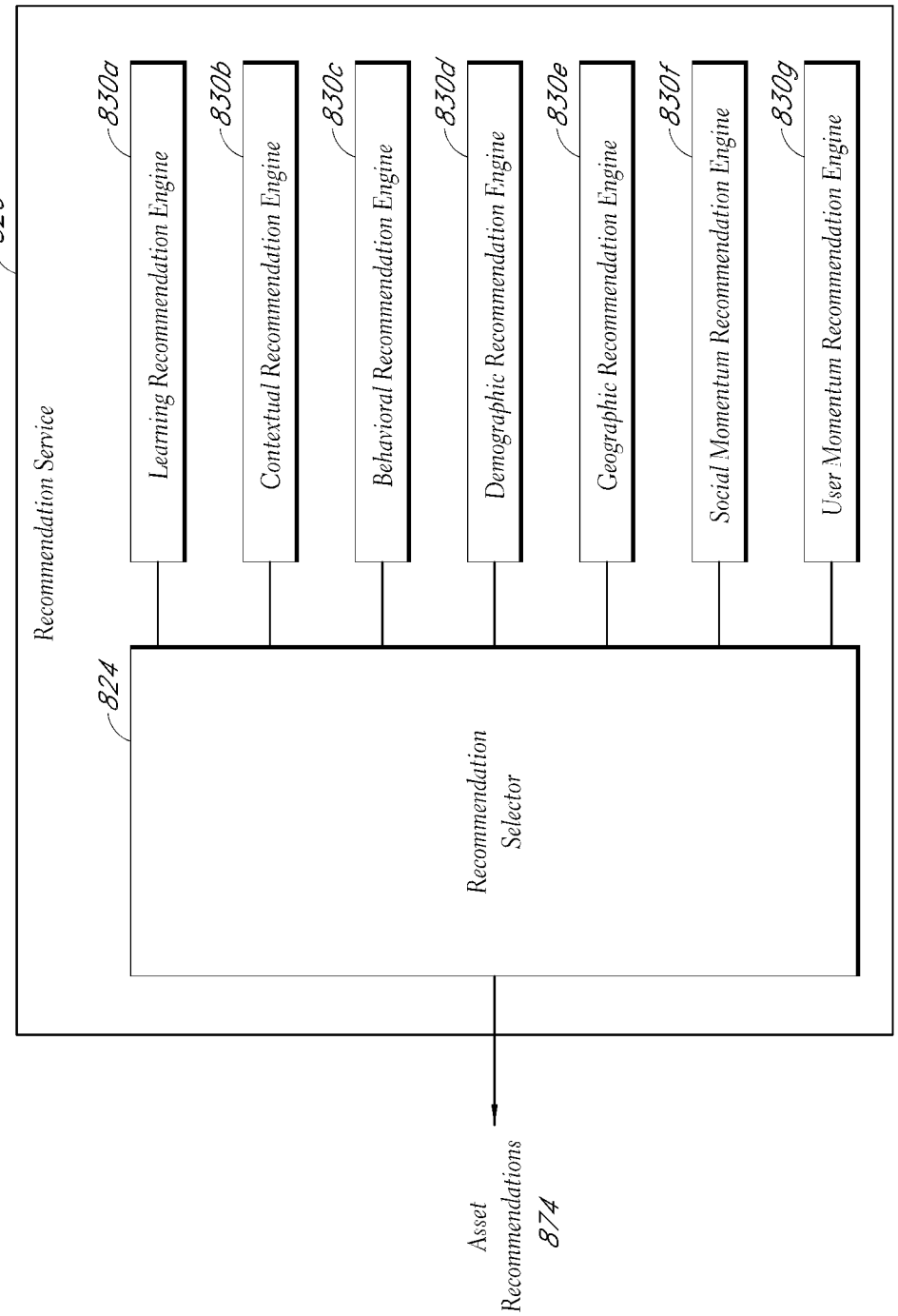
FIG. 8 illustrates a block diagram of an embodiment of a recommendation service of the asset recommendation system of FIG. 1.

FIG. 8 illustrates an embodiment of a recommendation service 820. The recommendation service 820 illustrates a more detailed embodiment of the recommendation service 120 described above with respect to FIG. 1. As such, the recommendation service 820 includes multiple recommendation engines 830 and a recommendation selector 824. The recommendation engines 830 may have some or all of the functionality of the recommendation engine 230 and may have additional features. Additional recommendation engines not shown herein may be included in the recommendation service 820 in various embodiments.

The illustrated recommendation service 820 comprises a learning recommendation engine 830a. In certain embodiments, the learning recommendation engine 830a retrieves a first user's browse information or history data from a data repository or the like. The browse information data may include asset selection data and data on network resources viewed or browsed by the user, by a group of users, and/or on a particular computer, purchases made by the user, and the like. The asset selection data may include data on the first user's selections of advertisements or the like.

If the first user has asset selection data, the learning recommendation engine 830a may create a relationship between the user's asset selections and one or more network resources in the first user's browse information. For example, the learning recommendation engine 830a can create a relationship between an advertisement the user selected and web pages viewed by the first user in a browse session. In an embodiment, the learning recommendation engine 830a performs this analysis and creation of relationships in an off-line process or separate process from a recommendations generation process.

The learning recommendation engine 830a may then access user tracking data of a second user currently accessing network resources. This user tracking data may include browse information data for the second user. In order to provide recommendations for the second user, the learning recommendation engine 830a in certain embodiments determines whether the second user's browse information is similar to the first user's browse information. For example, the learning recommendation engine 830a may determine if the two browse histories include overlapping network resources or web pages visited by both users. If the learning recommendation engine 830a determines that there is significant enough overlap, the learning recommendation engine 830a can recommend one or more of the first user's asset selections to the second user. Thus, in certain embodiments the learning recommendation engine 830a can provide recommendations based on feedback from other users, thereby intelligently learning from user asset selections.

A contextual recommendation engine 830b is also shown in the depicted embodiment. The contextual recommendation engine 830b may generate recommendations based on contextual targeting. Contextual targeting may include targeting based on the text (or context) of a network resource (for example, email or a web page) a user is currently accessing or recently accessed.

Certain currently-available contextual-based targeting systems rely on exact keyword matching of words in the text with keywords defined for an advertisement. For example, certain currently-available contextual targeting systems processing a body of text may pick up the word "bike." The system will then look up advertisements for the keyword "bike." The system will then provide the advertisement to the user. The typical result is that if a user is reading an article about bikes, the user will see advertisements for bikes.

In contrast, the contextual recommendation engine 830b can use word, category, and/or asset relationships to generate contextual recommendations. Using the above example, the contextual recommendation engine 830b can find other words, concepts, categories, or the like that people who are interested in "bikes" may also be interested in. The contextual recommendation engine 830b may find these words, concepts, categories, or the like in previously generated relationship data (which may be generated by the contextual recommendation engine 830b in a separate process). The resulting words, concepts, and categories can be used by the contextual recommendation engine 830b to find advertisements. For example, these advertisements may be for running, skiing, road safety, helmets, bike components, or any of a variety of interests stored in the relationship data.

A behavioral recommendation engine 830c is also shown in the depicted embodiment. The behavioral recommendation engine 830c may generate recommendations based on a user's browse information or other user behavior.

Certain currently available behavioral targeting systems can be based on simple categorizations of a publisher's web site. For example, a web page on a publisher's site may be categorized as "auto" or "finance." When a user browses to one of these pages, that user may be tagged as being interested in "auto" or "finance." The user can be subsequently shown advertisements for cars or stocks, for example.

One drawback of these currently-available systems is that they may only work for web sites or web pages that can be easily categorized. Many other web sites or web pages, however, cannot be easily categorized. To get around this problem, certain currently-available behavioral targeting systems extend the window for which they track behavior. To illustrate, instead of looking at the user's current browse session, which may contain relatively few web pages visited by the user, currently-available systems may look at several weeks or months of user browse information in order to catch the user visiting a page which can be categorized. One problem with extending the browse information window is that the user can be in a completely different mindset than they were when they visited the categorizable network resource. In addition, if the user visited a small number of categorizable pages, the currently-available behavioral targeting system may continually show the same advertisements to the user. Moreover, if multiple users use a single computer, behavioral tracking from this computer may lead to erroneous inferences being drawn from the users' behavioral data.

For example, in a currently-available system, if a user visits a web page categorized as "auto," then that user may be tagged as being interested in "auto" for potentially several months. Even if the user accidentally visited the auto page or was interested in autos but now has purchased a car and is no longer interested, or was just doing research for someone else, the currently-available system may still continually present auto advertisements to that user.

In contrast, in certain embodiments the behavioral recommendation engine 830c may access word, category, and other relationship data to generate targeted recommendations. Using these relationships can enable targeted recommendations to be generated using a smaller window of user browse information. In fact, in certain embodiments, a single network resource may be analyzed to retrieve words from the network resource. Because the words may have relationships with other words, categories, and assets in the relationship data, targeted advertisements can be generated.

Figure 9:
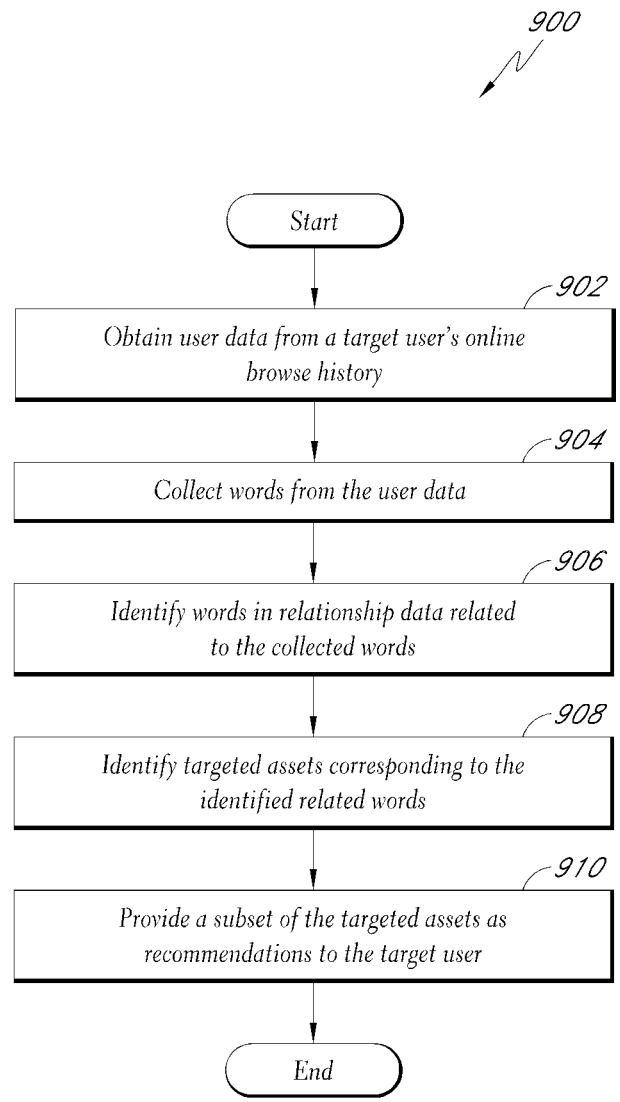
FIGS. 9 and 10 illustrate flowcharts of embodiments of processes for generating recommendations using certain embodiments of the recommendation service of FIG. 8.

Referring to FIG. 9, an example behavioral recommendation process 900 is shown for generating behavioral recommendations using, for example, the behavioral recommendation engine 830c of FIG. 8. At block 902, user data is obtained from a target user's online browse information or history. Words are then collected from this data at block 904. The words may be, for example, found in one or more web pages or web sites visited by the user.

At block 906, words in relationship data that are related to the collected words are identified. The relationship data may be generated in a separate or off-line process as described above. At block 908, targeted assets are identified that correspond to or are otherwise related with the identified words in the relationship data. Identified words (and inferred categories) that are common across several network resources the target user has accessed can have greater weight than less frequently-used words. Thus, recommendations based on more frequently-used words may be given greater weight. A subset of the targeted assets may be provided as recommendations to the target user at block 910.

In some embodiments, word and/or other relationships may be used to identify relevant advertisements (or other assets) for a given web page or other network resource accessed by a user. Those advertisements may be tagged or otherwise identified as being related to that given web page. For example, an asset-URL (Uniform Resource Locator) relationship may be created between the advertisement and the web page's URL. When other users browse the same URL, the URL can be used to lookup the asset-URL relationship, and the related advertisement can be presented to the user without performing the text processing blocks 904-908.

Referring again to FIG. 8, another recommendation engine that may be used in the recommendation service 820 is a demographic recommendation engine 830*d*. The demographic recommendation engine 830*d* may use data obtained from social sites or the like to generate relationships between demographic data and user interests. For example, a social site may have a 37 year old male who is interested in stock investments. In this example, the demographic recommendation engine 830*d* can create a relationship between "stock investing" and "37 years old" and another relationship between "stock investing" and "males."

The demographic recommendation engine 830*d* may use this relationship data in several ways. For instance, if a third party is operating a stock investing web page, the demographic recommendation engine 830*d* may display advertisements or other assets identified as suitable for 37 year old males. As another example, if a user's browse information includes an access to a web page that fits a 37 year old male demographic profile, the demographic recommendation engine 830*d* may display an advertisement related to investing.

Another recommendation engine 830 that may be included in the recommendation service 820 is a geographic recommendation engine 830*e*. The geographic recommendation engine 830*e* may obtain data from social sites or the like and generate word and/or category relationships associating geographic data with user interests. For example, a social site may have a "California resident" who is interested in "surfing." In this example, the geographic recommendation engine 830*e* may generate a relationship between "California" and "surfing."

In certain embodiments, the geographic recommendation engine 830*e* uses relationship data as follows. The geographic recommendation engine 830*e* accesses an IP (internet protocol) address of a target user's browse information to determine the target user's geographic location. Using this geographic information, the geographic recommendation engine 830*e* targets an individual who is physically in California with advertisement recommendations for local Californian businesses and also with advertisements for products related to "surfing" which are been identified by the geographic recommendation engine 830*e* as things of interest to Californians.

In addition to the recommendation engines 830 described above, a social momentum recommendation engine 830*f* is provided in the depicted embodiment. The social momentum recommendation engine 830*f* can recommend advertisements based on the amount of social momentum for a word, category, or asset related to the recommended advertisements. These recommendations in certain embodiments are not based on a target user's browse information. Rather, this engine 830*f* can provide recommendations related to generally popular words, categories, or ideas that have social momentum.

As one illustrative example, bloggers may be blogging a great deal about a particular news item. Because this news item is receiving significant attention, the news item might be considered to have significant social momentum. The social momentum recommendation engine 830*f* can extract words related to the news item from social-network data (and/or reference data) and find related words, categories, and/or assets. From these words, categories, and/or assets, the social momentum recommendation engine 830*f* can retrieve asset recommendations for users.

A user momentum recommendation engine 830*g* is also shown in the depicted embodiment. The user momentum recommendation engine 830*g* may generate recommendations based on user interest in items within a client's web site or other network resource. For example, a new user of a particular web site might be unaware of a product that is popular with users of that web site. The user momentum recommendation engine 830*g* may therefore recommend the product or related assets to the new user.

Recommendations based on user momentum can be determined by sampling user momentum over a period or window of time. This window of time may vary for different network resources. Example windows include a 15 minute window, an hour window, a day window, a week window, a month window, and the like. For network resources that update frequently, such as news sites, the user momentum recommendation engine 830*g* may use a smaller window to sample user momentum. For instance, a news story that was popular an hour ago may not be popular an hour later; hence, recommendations generated based on that news story may be relevant for a short period of time. The user momentum recommendation engine 830*g* may use longer windows for other network resources, such as product web sites, as product-related recommendations for these sites may be more relevant for a longer window of time.

The recommendation selector 824 may receive recommendations from each recommendation engine 830 and select from those recommendations a subset of recommendations 874 to provide to a target user. The recommendation selector 824 may use several factors to determine which recommendations to select. For example, the recommendation selector 824 may give greater weight to recommendations that are recommended by multiple recommendation engines 830.

In addition, the recommendation selector 824 may normalize the weighted recommendations provided by each recommendation engine 830 so as to better compare the recommendations from multiple engines 830. This normalization process may include assigning higher weights to certain recommendation engines 830. These weights can indicate a preference for one recommendation engine's 830 output over another's. The weights can be predetermined manually and may be adjusted over time or for different target users.

To illustrate, each recommendation engine 830 may output recommendations that are weighted, ranked, or otherwise scored. The recommendation selector 824 may further impose an additional weighting on the recommendation engines 830 by multiplying, dividing, adding, subtracting, or otherwise manipulating the scores from certain recommendation engines 830. As a result, the output from each engine 830 can be compared. The recommendation selector 824 may then select a most highly-ranked subset of the recommendations to provide as asset recommendations 874.

While several example recommendation engines 830 have been described, other embodiments of a recommendation service need not have all the engines shown. Additional recommendation engines may also be provided in certain embodiments.

Figure 10:
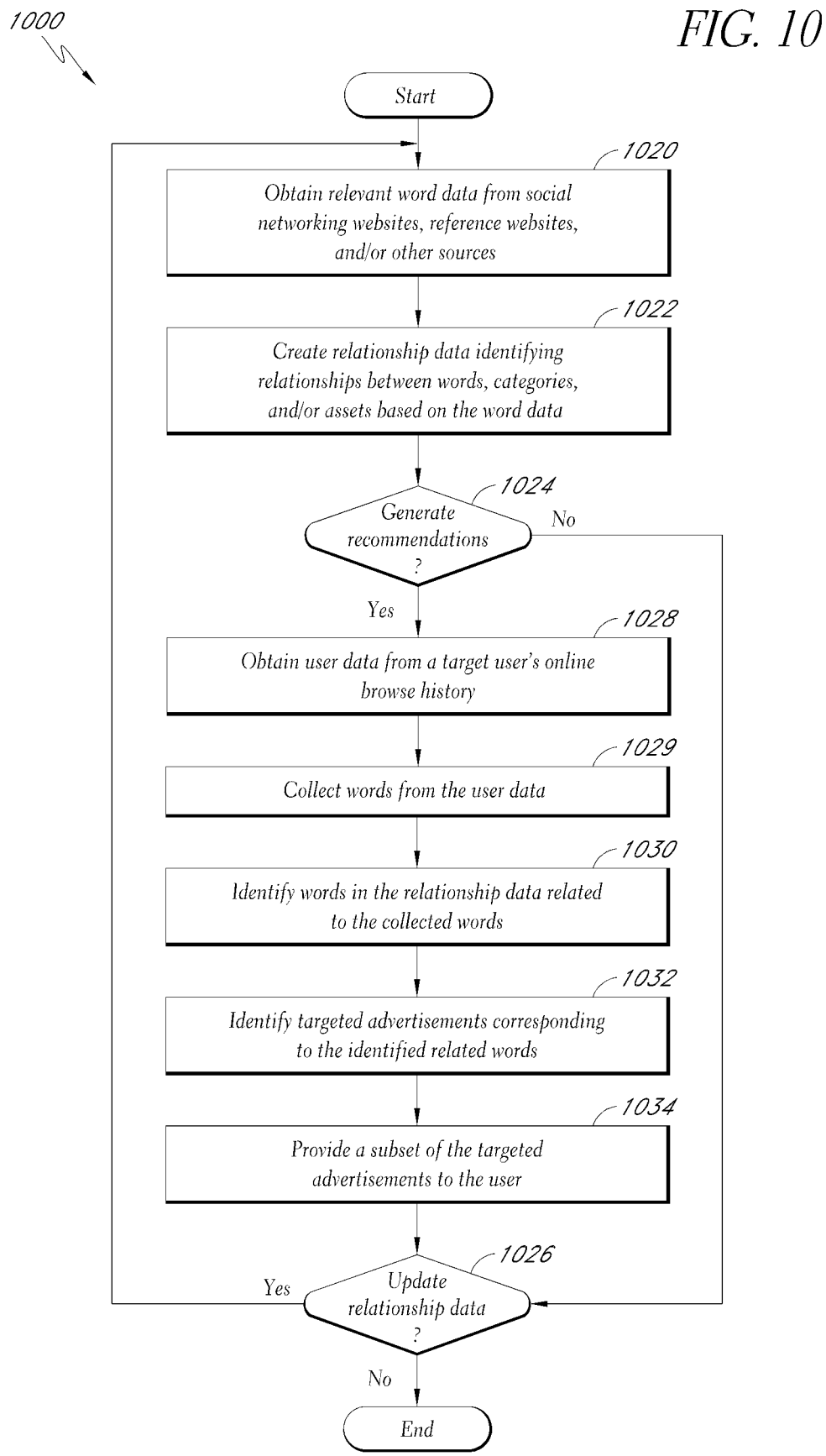

FIG. 10 illustrates an example asset recommendation process 1000 for recommending assets to a target user according to certain embodiments of the invention. In certain embodiments, the process 1000 is implemented, at least in part, by a recommendation engine, such as certain of the recommendation engines described above.

At block 1020 of the process 1000, relevant word data is obtained from social networking websites, reference websites, and/or other sources. This word data may be obtained, for example, by the data aggregation module 232 described above. At block 1022, relationship data is created identifying relationships between words, categories, and/or assets based on the relevant word data. The relationship data may be created, for example, by the relationship mining module 234 described above.

At decision block 1024, it is determined whether recommendations are to be generated. Recommendations may be generated, for instance, upon request by a third party server or a user system. This determination may be made by the recommender 236 described above, for example, in response to receiving a request from the third party server 104 for recommendations. If so, the process 1000 proceeds to block 1028. Otherwise, the process 1000 proceeds to block 1026.

At block 1026, it is determined whether to update the relationship data. If so, the process 1000 loops back to block 1020. The data aggregation module 232, for instance, may make this determination. Relationship data may be created and/or modified continuously, periodically, or from time to time. In addition, the relationship data may be updated while recommendations are provided to a third party server or user, for example, in blocks 1028 through 1034.

At block 1028, word data is obtained from a target user's online browse information. The word data may be obtained by the data aggregation module 232. The browse information can include one or more web pages or other network resources accessed by the target user. In an embodiment, the word data is obtained from a most current network resource accessed by the target user. The word data may also be obtained from the target user's current browsing session. In addition, the word data may be obtained from a selected period of time of the target user's browse information, such as the previous hour, current day, previous few days, previous week, previous month, or the like.

Words may be collected from this data at block 1029, for example, by data aggregation module 232. The words may be, for example, found in one or more web pages or other network resources accessed by the user. At block 1030, words in relationship data that are related to the collected words may be identified, for example, by the relationship mining module 234. At block 1032, targeted assets may be identified that correspond to or are otherwise related with the identified words in the relationship data. A subset of the targeted assets may be provided as recommendations to the target user at block 1034. Blocks 1032 and 1034 may be implemented by the recommender 236.

Conditional language used herein, such as, among others, "can," "could," "might," "may," and the like, unless specifically stated otherwise, or otherwise understood within the context as used, is generally intended to convey that certain embodiments may include, while other embodiments may not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may advantageously be configured to execute on one or more processors, including sub-processors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like. In certain embodiments, certain processes or modules described herein may be distributed over multiple processors or computers, such as servers.

The various features and processes described above may be used independently of one another or may be combined in various ways. All possible combinations and subcombinations are intended to fall within the scope of this disclosure. In addition, certain method or process steps may be omitted in some implementations.

While certain embodiments of the inventions disclosed herein have been described, these embodiments have been presented by way of example only and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the present disclosure. The accompanying claims and their equivalents are intended to cover such forms or modifications as would fall within the scope of the present disclosure.

What is claimed:

1. A method comprising:

obtaining, at a computing system, word data from data related to social networking activity of one or more users, the word data indicating words in content associated with the social networking activity, the social networking activity including one or more posts on one or more social networking sites;

generating, at the computing system, relationship data indicating one or more word relationships between multiple words indicated by the word data, each word relationship indicating an association between two or more of the multiple words and based on a degree of the association, wherein the degree of the association corresponds to a ranking based on a recency of the content, wherein a first ranking of a first degree of association is greater than a second ranking of a second degree of association based on the multiple words related to the first degree of association having a more recent content relationship than the multiple words related to the second degree of association;

analyzing, at the computing system, browse information of a target user device to identify one or more first words in the browse information;

identifying, at the computing system and based on the relationship data, second words that are related to the first words in the browse information;

identifying, at the computing system, one or more content items having at least one associated keyword that corresponds to the second words; and providing at least a portion of the one or more content items retrieved from a data repository to the target user device.

2. The method of claim 1, wherein the computer system comprises a server supporting multiple users and not dedicated to one individual user, and wherein the recency of the content is based on a date the content is published to the one or more social networking sites.

3. The method of claim 1, further comprising retrieving the word data from one or more social network resources, wherein providing the at least a portion of the one or more content items to the target user device comprises providing the at least a portion of the one or more content items to a third party server that hosts a webpage.

4. The method of claim 1, further comprising weighting the one or more first words based at least in part on a frequency of which the one or more first words appear in the browse information.

5. The method of claim 1, further comprising inferring one or more category relationships from the one or more word relationships and inferring one or more asset relationships from the one or more category relationships.

6. The method of claim 5, further comprising creating additional asset relationships by relating assets based at least in part on one or more browse behavior relationships of the one or more users.

7. The method of claim 1, wherein further comprising:
detecting a proximity of first and second words of the multiple words in the content;
determining a particular degree for the first and second words based on a particular recency of a portion of the content that contains the first and second words; and
creating the one or more word relationships based on the proximity and based on the particular degree.

8. The method of claim 1, wherein the degree of the association between the two or more of the multiple words is further based on an authority associated with the content.

9. The method of claim 8, wherein the authority associated with the content is based on an authority of a user that posted the content or an authority of the social networking site on which the content is posted.

10. The method of claim 1, wherein the content is selected based on a level of social media activity of the one or more users.

11. The method of claim 1, wherein the degree of the association between the two or more of the multiple words is further based on an amount of social momentum associated with the two or more of the multiple words.

12. The method of claim 11, wherein the social momentum corresponds to an amount of other social networking activity associated with the content and a recency of the other social networking activity.

13. The method of claim 1, further comprising extracting, at the computing system, signal words from the word data, the signal words including nouns and verbs, wherein the relationships between the multiple words are indicated by the signal words.

14. A computing system comprising:
a processor; and
a memory coupled to the processor, the memory storing instructions that, when executed by the processor, cause the processor to perform operations comprising:
obtaining word data from data related to social networking activity of one or more users, the word data comprising words in content associated with the social networking activity, wherein the social networking activity includes one or more posts on one or more social networking sites;
generating relationship data indicating one or more word relationships between multiple words indicated by the word data, each word relationship indicating an association between two or more of the multiple words and based on a degree of the association, wherein the degree of the association corresponds to a ranking based on a recency of the content, wherein a first ranking of a first degree of association is greater than a second ranking of a second degree of association based on the multiple words related to the first degree of association having a more recent content relationship than the multiple words related to the second degree of association;
analyzing browse information of a target user device to identify one or more first words in the browse information;
identifying, at the computing system and based on the relationship data, second words that are related to the first words in the browse information;
identifying, at the computing system, one or more content items having at least one associated keyword that corresponds to the second words; and
initiating transmission of at least a portion of the one or more content items retrieved from a data repository to the target user device.

15. The computing system of claim 14, wherein the data repository comprises a database configured to store a plurality of content items.

16. The computing system of claim 14, wherein the operations further comprise retrieving the data related to social networking activity from one or more social network resources.

17. The computing system of claim 14, wherein the operations further comprise inferring one or more category relationships from the one or more word relationships and inferring one or more asset relationships from the one or more category relationships.

18. The computing system of claim 17, wherein the operations further comprise:
creating additional asset relationships by relating assets based at least in part on one or more browse behavior relationships of the one or more users; and
inferring additional word relationships from the additional asset relationships.

19. The computing system of claim 14, wherein creating the one or more word relationships further comprises detecting a proximity of the multiple words in the content.

20. The computing system of claim 14, further comprising a server that includes the processor and the memory, wherein the operations include detecting, at the server, signal words in the content using one or more natural language processing techniques.

21. The computing system of claim 20, wherein detecting the signal words comprises generating graphs of the words indicated by the word data, the graphs comprising overlapping categories or related words of the words indicated by the word data.

22. A non-transitory, computer readable medium storing instructions that, when executed by a processor, cause the processor to perform operations comprising:
   obtaining, at a computing system, word data from data related to social networking activity of one or more users, the word data indicating words in content associated with the social networking activity, wherein the social networking activity includes one or more posts on one or more social networking sites;
   generating, at the computing system, relationship data indicating one or more word relationships between multiple words indicated by the word data, each word relationship indicating an association between two or more of the multiple words and based on a degree of the association, wherein the degree of the association corresponds to a ranking based on a recency of the content, wherein a first ranking of a first degree of association is greater than a second ranking of a second degree of association based on the multiple words related to the first degree of association having a more recent content relationship than the multiple words related to the second degree of association;
   analyzing, at the computing system, browse information of a target user device to identify one or more first words in the browse information;
   identifying, at the computing system and based on the relationship data, second words that are related to the first words in the browse information;
   identifying, at the computing system, one or more content items having at least one associated keyword that corresponds to the second words; and
   providing at least a portion of the one or more content items retrieved from a data repository to the target user device.

23. The non-transitory, computer readable medium of claim 22, wherein providing the at least a portion of the one or more content items to the target user device comprises providing the at least a portion of the one or more content items to a third party server that hosts a webpage.

24. The non-transitory, computer readable medium of claim 22, wherein the operations further comprise retrieving the data related to social networking activity from one or more social network resources.

25. The non-transitory, computer readable medium of claim 22, wherein the operations further comprise weighting the one or more first words based at least in part on a frequency of which the one or more first words appear in the browse information.

26. The non-transitory, computer readable medium of claim 22, wherein the operations further comprise inferring one or more category relationships from the one or more word relationships and inferring one or more asset relationships from the one or more category relationships.

27. The non-transitory, computer readable medium of claim 26, wherein the operations further comprise:
   creating additional asset relationships by relating assets based at least in part on one or more browse behavior relationships of the one or more users; and
   inferring additional word relationships from the additional asset relationships.

28. A method comprising:
   obtaining first data indicating words in content associated with social networking activity that includes a user post on a social networking site;
   generating second data indicating an association between first words of the indicated words and indicating a degree of the association, the degree of the association corresponds to a ranking based on a recency of the content, wherein a first ranking of a first degree of association is greater than a second ranking of a second degree of association based on the multiple words related to the first degree of association having a more recent content relationship than the multiple words related to the second degree of association;
   identifying, at a computing system, a word in browse information of a target user device, a second word determined based on the second data to be related to the word, and a content item having an associated keyword that corresponds to the second word; and
   providing a portion of the content item retrieved from a data repository to the target user device.

29. The method of claim 28, wherein:
   the association is detected or created at the computing system,
   the first words are selected from a plurality of the indicated words in the content,
   the second data indicates a word relationship between the first words, and
   the word relationship indicates the association.

* * * * *